May 5, 1942.  H. RINIA  2,281,954
DEVICE FOR SYNCHRONIZING THE SPEED OF ROTATION OF A ROTATING BODY
Filed Sept. 26, 1939

INVENTOR
HERRE RINIA
BY H. G. Snover
ATTORNEY

Patented May 5, 1942

2,281,954

UNITED STATES PATENT OFFICE 2,281,954

DEVICE FOR SYNCHRONIZING THE SPEED OF ROTATION OF ROTATING BODIES

Herre Rinia, Eindhoven, Netherlands, assignor, by mesne assignments, to Radio Corporation of America, New York, N. Y., a corporation of Delaware Application September 26, 1939, Serial No. 296,623
In the Netherlands September 27, 1938

4 Claims. (Cl. 172—293)

This invention relates to a device for synchronizing the speed of rotation of a rotating body by means of a control current or control voltage which depends on the deviation from the phase prescribed and which exerts a synchronizing force on the rotating body.

According to the invention, means are provided to displace in phase the alternating current component of the control current or control voltage caused by oscillation of the rotating body in such a manner that the force exerted by this alternating current component on the rotating body leads in phase with respect to the deflection of the oscillation.

The invention will be more clearly understood by reference to the accompanying drawing, in which—

Figure 1:
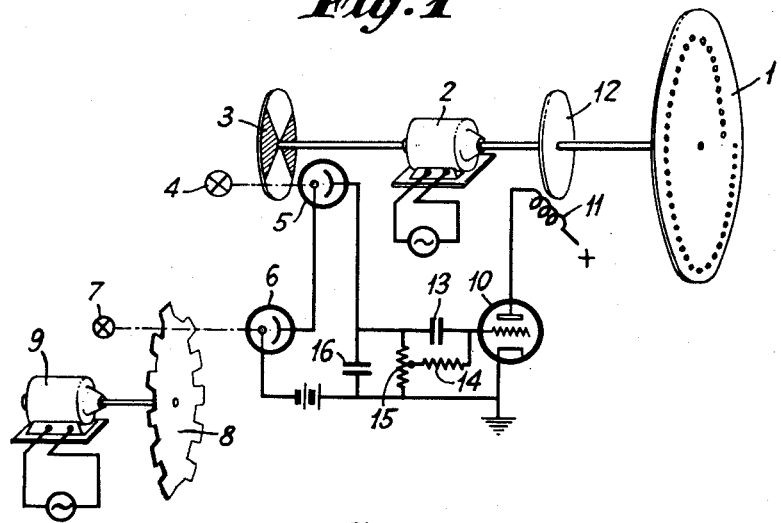
Figure 2:
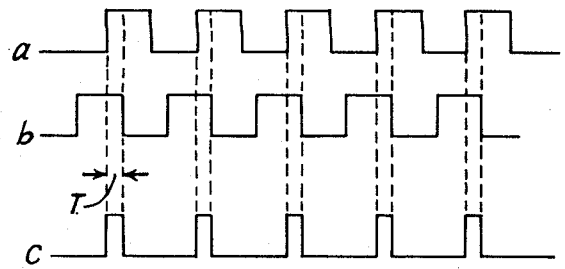
Figure 3:
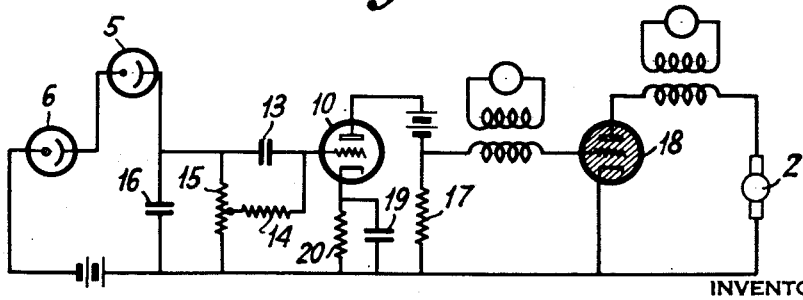

Fig. 1 shows one embodiment of my invention,
Fig. 2 is a set of explanatory curves, and
Fig. 3 is a further embodiment of my invention.

Fig. 1 of the drawing represents a part of the scanning device of a television transmitting system in which is used a rotating body, in this instance a scanning disc 1, whose speed of rotation must be kept exactly constant relatively to the frequency of the A. C. mains. This scanning disc is driven from an asynchronous motor 2, for instance a collector motor, which is fed from the A. C. mains. It is impossible to substitute a synchronous motor for an asynchronous motor, since the number of revolutions of the scanning disc is, for instance, 7500 a minute and consequently exceeds 3000 which, with a mains frequency of 50 cycles per second, is the maximum speed that can be attained by means of a synchronous motor. When using a synchronous motor, a speed of 7500 a minute may be obtained only by means of a synchronous converter by which the mains frequency of 50 cycles per second is transformer into 125 cycles per second. However, this solution is expensive so that it is preferable to use an asynchronous motor, but in this case special measures must be taken to keep the speed constant. In the device shown in Fig. 1, synchronization is effected in the following manner:

The shaft of the motor 2 has mounted on it a sector disc 3 by which the light emitted by a light source 4 and thrown on a photoelectric cell 5 is intercepted twice per revolution. In Fig. 2a, the beam of light striking the photoelectric cell 5 is represented as a function of time. At the correct speed of 7500 revolutions a minute of the motor 2, the frequency of the impulses shown in Fig. 2a is 250 per second.

In series with the photoelectric cell 5, there is connected a second photoelectric cell 6 which is illuminated by a source of light 7. Between the light source 7 and the photoelectric cell 6 is provided a sector disc 8 which is driven from a synchronous motor 9, which is fed from the A. C. mains, at a constant speed of 1500 revolutions a minute. The disc 8 has ten sectors so that the photoelectric cell 6 is periodically exposed with a frequency of 250 impulses a second. In Fig. 2b, the beam of light striking the photoelectric cell 6 is shown as a function of time.

Since the two photoelectric cells 5 and 6 are connected in series, a photoelectric current can flow only if both photoelectric cells are exposed simultaneously. If the desired ratio exists between the speeds of the motor 2 and the motor 9 that part of the period of the beam of light striking the photoelectric cells 5 and 6, in which both are exposed simultaneously, depends on the phase of the disc 3 with respect to the disc 8. In this case, a control current consisting of successive impulses of a duration T flows in the common output circuit of the photoelectric cells 5 and 6. If, however, the phase displacement between the discs 3 and 8 increases the duration T of the impulses occuring in the output circuit of the cells increases, and decreases with a decreasing phase-displacement. The impulses thus obtained are supplied to the grid circuit of an amplifying tube 10. The anode circuit of this tube includes the exciting winding 11 of a Foucault-current brake 12. The impulses amplified by the tube 10 produce a magnetic field in the exciting winding 11 as a result of which a braking force is exerted on the scanning disc 1.

This braking force increases if the disc 3 leads more with respect to the disc 8, due to which the latter is brought back into the correct phase. The braking force decreases when the phase displacement between the discs 3 and 8 decreases whereby the correct phase displacement is also re-established. Moreover, this synchronizing force causes that the prescribed constant ratio between the speeds of the motors 2 and 9 is established if the disc 3 starts asynchronously.

Keeping constant the speed in the manner referred to above is impeded if the rotating body has a large moment of inertia, due to which the frequency with which the phase of the body may oscillate about a state of equilibrium, becomes low, for instance of the order of magnitude of 1 cycle per second. To suppress these oscillations of the scanning disc 1, the following steps are taken according to the invention.

Oscillation of the scanning disc 1 causes a sinusoidal relative variation of the phase of the disc 3 with respect to the disc 8 which means a periodical increase and decrease, varying sinusoidally with time, of the duration T of the impulses represented in Fig. 2c.

In this case, the current in the common output circuit of the two photoelectric cells 5 and 6 includes an alternating current component whose frequency corresponds to the frequency of the oscillation of the scanning disc 1 and which is in phase with the deflection of the oscillation.

According to the invention, the input circuit of the discharge tube 10 comprises a phase-displacing network consisting of the series-connection of a condenser 13 and resistance 14. Consequently, the alternating current component of the control voltage set up at the grid of the tube 10, which component is caused by oscillation, leads in phase with respect to the voltage which is supplied to the mains and is set up across a resistance 15. By means of the Foucault current brake 12, the said alternating current component exerts a synchronizing force on the scanning disc 1 which force leads with respect to the deflection of the oscillation, whereby oscillation is counteracted. The invention is based on the recognition that just as it is necessary for damping the oscillatory movement of a pendulum to exert a force on the pendulum, which leads with respect to the deflection of the pendulum, oscillation of a rotating body can be suppressed also in the present case by exerting on the rotating body a force which leads with respect to the deflection of the oscillation. The condenser 16 interposed in the output circuit of the two photoelectric cells serves to suppress the alternating current components having a high frequency, first of all of the frequency of 250 cycles per second of the beam of light thrown on the cell 5 and 6 respectively.

Fig. 3 represents another form of construction of the device according to the invention, in which the speed of the motor 2 is synchronized by supplying the control current to the motor 2. In this form of construction, the control voltage set up in the output circuit of the tube 10 is supplied to the grid of a gas-filled discharge tube 18, the motor 2 being included in the anode-circuit. To the grid and the anode of the tube 18 are applied two alternating voltages which are displaced in phase by 90° and are taken from the A. C. mains. The tube 18 is traversed by anode current only during the time in which the grid is positive till the anode becomes negative. This time is dependent and controlled by the control voltage set up across the resistance 17. Consequently, the current traversing the motor 2 and thus the speed of this motor is governed and kept constant by the value of this control voltage. Since, similarly to Fig. 1, the network 13, 14 is included in the input circuit of the tube 10 oscillation of the scanning disc driven from the motor 2 is suppressed.

Moreover, the cathode lead of the tube 10 includes a resistance 20 which is bridged by a condenser 19.

The amplifying tube 10 thus back-coupled in a degenerative manner also causes the alternating current component of the control impulses to lead, as a result of which the total lead and consequently the damping are increased. If desired, each of the expedients indicated in Fig. 3 for obtaining lead may be used separately.

What I claim is:

1. Apparatus for synchronizing the operation of a rotating body with that of a rotating standard comprising light interrupting means driven by said rotating body, means for photoelectrically developing a recurrent signal in response to the action of said light interrupting means, a rotating standard reference device, means for photoelectrically developing recurrent signals indicative of the position of said standard reference device, the photoelectric portions of said latter means and said means driven by said rotating body being serially connected whereby current flows through the serial connection only when both of said photoelectric means are energized, impedance means connected substantially in parallel with said serially connected photo-electric means, a phase changing circuit comprising condenser means and resistance means, said condenser means and said resistance means being connected substantially in parallel each with the other, electric switching means, said phase changing circuit being connected serially with said impedance means and said switching means, means for impressing the signal in the serially connected photoelectric means on to said phase changing means, a braking apparatus, and means for energizing said braking apparatus in accordance with the occurrence of the signal developed in said photo-electric means and impressed at least partially onto said switching means.

2. Apparatus in accordance with claim 1 wherein said braking apparatus comprises an eddy current brake operatively associated with said rotating body.

3. Apparatus in accordance with claim 1 wherein said reference standard comprises a toothed member driven by a synchronous motor.

4. Apparatus in accordance with claim 1, wherein said electric switching means comprises a thermionic tube having an output circuit and wherein there is provided in addition a second gas filled thermionic tube having anode, cathode and at least one control electrode, said tube being electrically coupled to the first thermionic tube, and wherein means are provided for impressing onto the grid and the anode of said gas filled tube alternating voltages which are displaced in phase by substantially 90°.

HERRE RINIA.